United States Patent [19]

Kishida et al.

[11] Patent Number: 4,878,081
[45] Date of Patent: Oct. 31, 1989

[54] EXPOSURE CONTROL DEVICE FOR A CAMERA

[75] Inventors: Daisuke Kishida, Yokohama; Saburo Sasaki, Tokyo, both of Japan

[73] Assignee: Ricoh Company, Ltd., Tokyo, Japan

[21] Appl. No.: 234,528

[22] Filed: Aug. 22, 1988

[30] Foreign Application Priority Data

Aug. 24, 1987 [JP] Japan .................................. 62-127444

[51] Int. Cl.$^4$ ........................... G03B 7/16; G03B 15/05
[52] U.S. Cl. .................................... 354/414; 354/419; 354/421; 354/137
[58] Field of Search ............... 354/414, 419, 420, 421, 354/422, 137, 429–434

[56] References Cited

U.S. PATENT DOCUMENTS

| | | | |
|---|---|---|---|
| 3,855,601 | 12/1974 | Uchiyama et al. | 354/414 |
| 4,690,536 | 9/1987 | Nakai et al. | 354/414 X |
| 4,772,910 | 9/1988 | Fields | 354/414 |
| 4,801,964 | 1/1989 | Desormeaux | 354/414 |
| 4,812,872 | 3/1989 | Desormeaux | 354/414 |

*Primary Examiner*—W. B. Perkey

*Attorney, Agent, or Firm*—Oblon, Spivak, McClelland, Maier & Neustadt

[57] ABSTRACT

An exposure control device for a camera having a photometric unit for measuring brightness of an object and its ambient brightness individually, a range finding unit for measuring a distance from the device to the object, and a strobe light unit, the device including backlight detecting unit for detecting whether the object is in a backlight condition or not on the basis of the brightness of the object and its ambient brightness measured by the photometric unit; and a unit for allowing the strobe light to flash in either case the brightness of the object measured by the photometric unit is smaller than a predetermined brightness or the object is detected to be in the backlight condition by the backlight detecting unit, if the distance from the device to the object measured by the range finding unit is smaller than a predetermined distance, and for lengthening an exposure time without allowing the strobe light to flash within the limits of a predetermined time in case the object is detected to be in the backlight condition by the backlight detecting unit, if the distance from the device to the object measured by the range finding unit is larger than the predetermined distance.

5 Claims, 5 Drawing Sheets

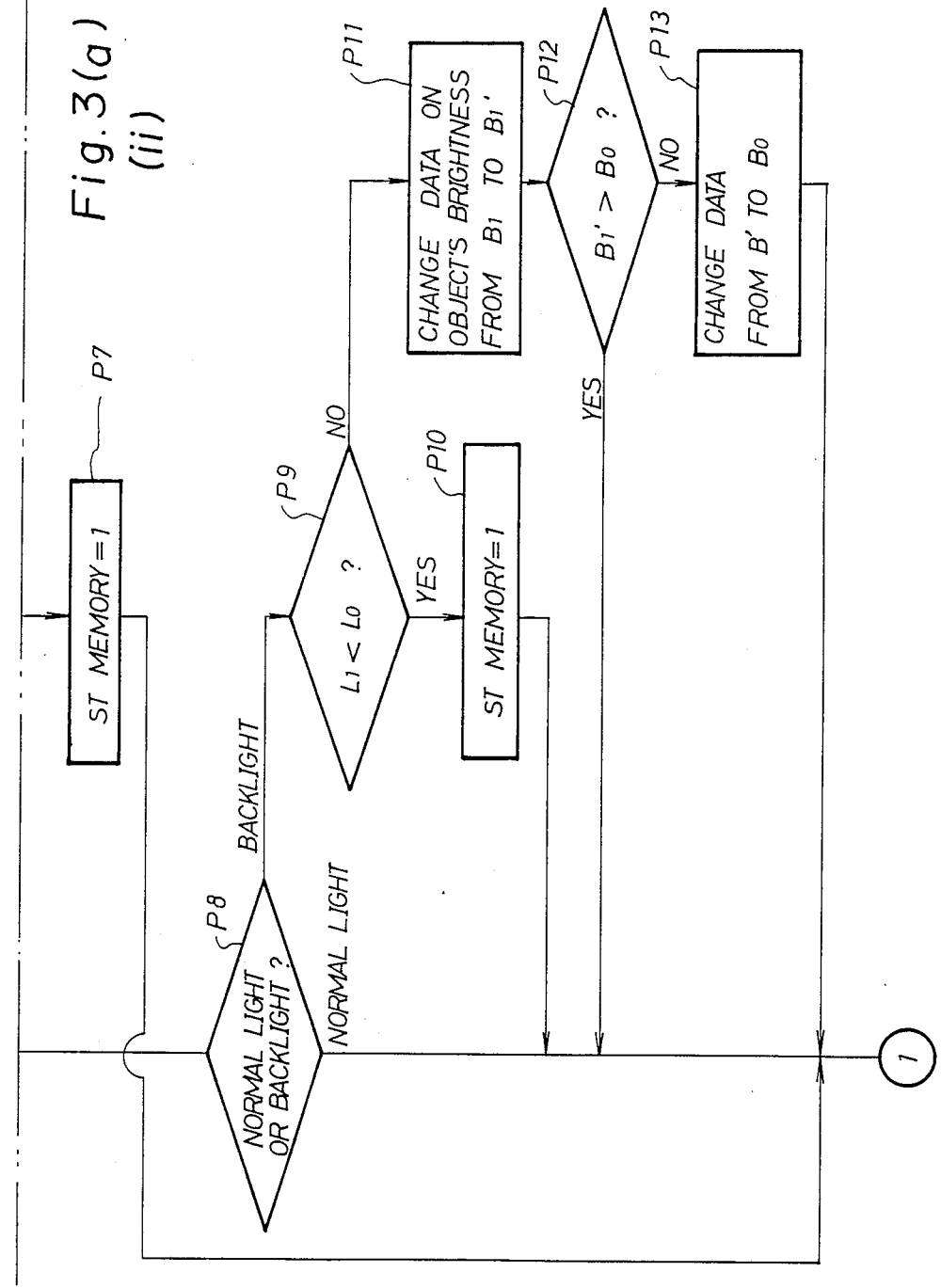
Fig. 3(a) (ii)

EXPOSURE CONTROL DEVICE FOR A CAMERA

BACKGROUND OF THE INVENTION

The present invention relates to an exposure control device for a camera having a range finding system and a strobe light system.

In taking a picture in backlight condition, it is necessary to compensate exposure for the backlight. It is a conventional practice to provide a camera with a BLC (backlight control) button as means for compensating for the backlight.

When the BLC button is pressed, a quantity of exposure increases by a predetermined quantity, for example, of +1.5 EV, +1.75 EV or +2 EV. In the camera with such BLC button, a problem arises when a picture is taken in a relatively dark backlight because in the dark condition, the shutter speed set to a lower value by an exposure control unit beforehand is changed to a further lower value by pressing the BLC button. Therefore, if the camera is held in the user's hand, there is a high probability that a blurred photograph will be taken. In those cameras which automatically sense and compensate for the backlight, such a probability further increases.

SUMMARY OF THE INVENTION

It is therefore an object of the present invention to provide an exposure control device for a camera which can reduce the probability that a blurred photograph will be taken in the backlight.

The above object of the present invention is achieved by an exposure control device for a camera having a photometric unit for measuring brightness of an object and its ambient brightness individually, a range finding unit for measuring a distance from the device to the object, and a strobe light unit, said device comprising:

backlight detecting means for detecting whether the object is in a backlight condition or not on the basis of the brightness of the object and its ambient brightness measured by the photometric unit; and means for allowing the strobe light to flash in either case the brightness of the object measured by the photometric unit is smaller than a predetermined brightness or the object is detected to be in the backlight condition by the backlight detecting means, if the distance from the device to the object measured by the range finding unit is smaller than a predetermined distance, and for lengthening an exposure time without allowing the strobe light to flash within the limits of a predetermined time in case the object is detected to be in the backlight condition by the backlight detecting means, if the distance from the device to the object measured by the range finding unit is larger than the predetermined distance.

The above and other features and advantages of the present invention will be apparent from the following description of the preferred embodiment illustrated in the accompanying drawings.

DETAILED DESCRIPTION OF THE PREFERRED EMBODIMENT

A preferred embodiment of the present invention will now be described in detail with reference to accompanying drawings.

Figure 1:
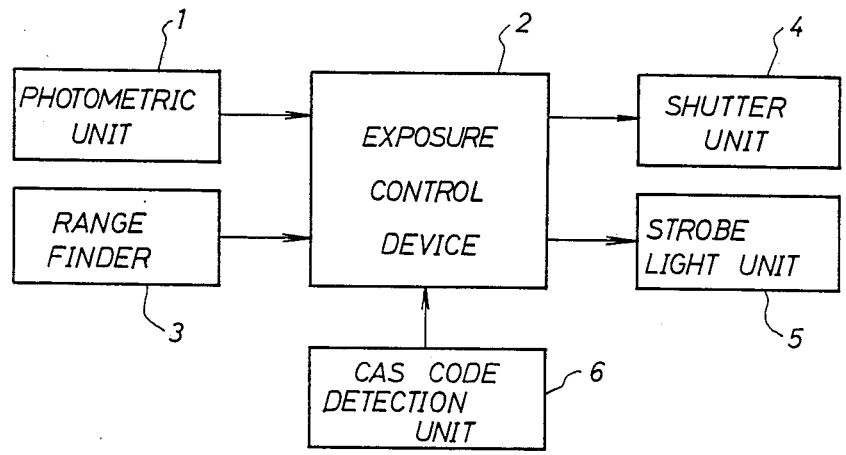
FIG. 1 is a block diagram showing the structure of a preferred embodiment of the present invention.

FIG. 1 shows a lens shutter camera to which the exposure control device according to the present invention is applied. In FIG. 1, a photometric unit 1 measures the brightness of a main object and its ambient brightness and sends the measured data to an exposure control device 2. A range finding circuit 3 measures the distance from the camera to the main object and sends the data on the distance to the control device 2. A shutter unit 4 opens and closes shutter blades in accordance with data on the shutter speed given by the control device 2. A strobe unit 5 is controlled by the control device 2 to charge and discharge a strobe light source capacitor. A CAS code detection unit 6 detects data on the film sensitivity, namely, the so-called CAS code, and sends it to the control device 2.

Figure 2:
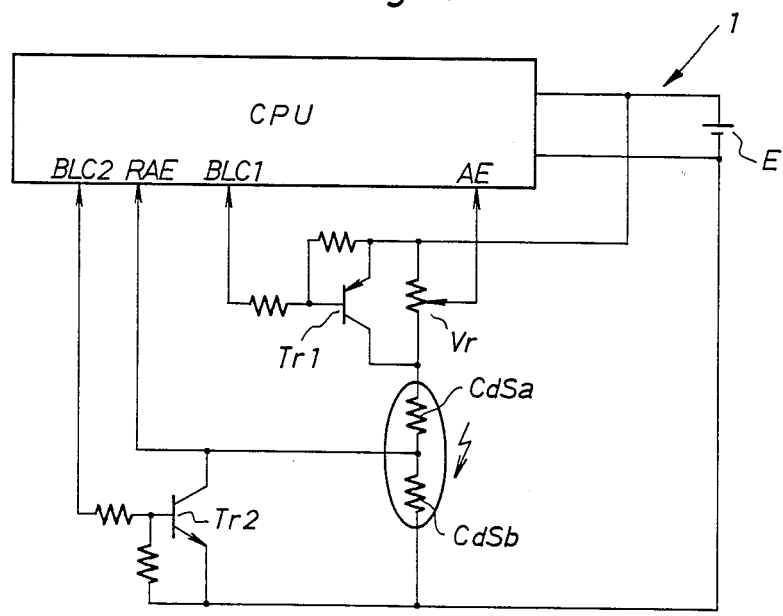
FIG. 2 is a circuit diagram showing the detailed structure of a photometeric unit of the embodiment.

As shown in FIG. 2, the photometric unit 1 includes a first and a second switching transistors Tr 1 and Tr 2, a photometric element which measures the intensities of light from the main object and its ambient space, the photometric element being made of a pair of CdS cells CdSa and CdSb, a variable resistor Vr, and a central processing unit CPU with an analog-to-digital converter. The resistor Vr and the pair of CdS cells are connected in series as shown. This series circuit is connected to a power source E which supplies power to the CPU. The first transistor Tr 1 short-circuits the resistor Vr when the transistor Tr 1 is turned on. The second transistor Tr 2 short-circuits the cell CdSb when the transistor Tr 2 is turned on. The two transistors are turned on/off in accordance with a control signal applied to their bases via terminals BLC 1 and BLC 2 of the CPU. A movable contact of the resistor Vr is connected to a terminal AE of the CPU while the junction point of the two CdS cells is connected to a terminal RAE of the CPU. To measure the brightness of the main object, the transistors Tr 1 and Tr 2 are turned off and on respectively, and a voltage signal is supplied to the terminal AE connected to the movable contact. To compare the brightness of the main object with that of the ambient brightness, the transistors Tr 1 and Tr 2 are turned on and off respectively, and a voltage signal is supplied to the terminal RAE of the CPU connected to the junction of the CdSa and CdSb.

Figure 3A:
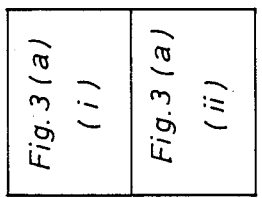
FIGS. 3, 3(a)(i), 3(a)(ii), and 3(b) are flowcharts for explaining the operation of the embodiment.
Figure 3A:
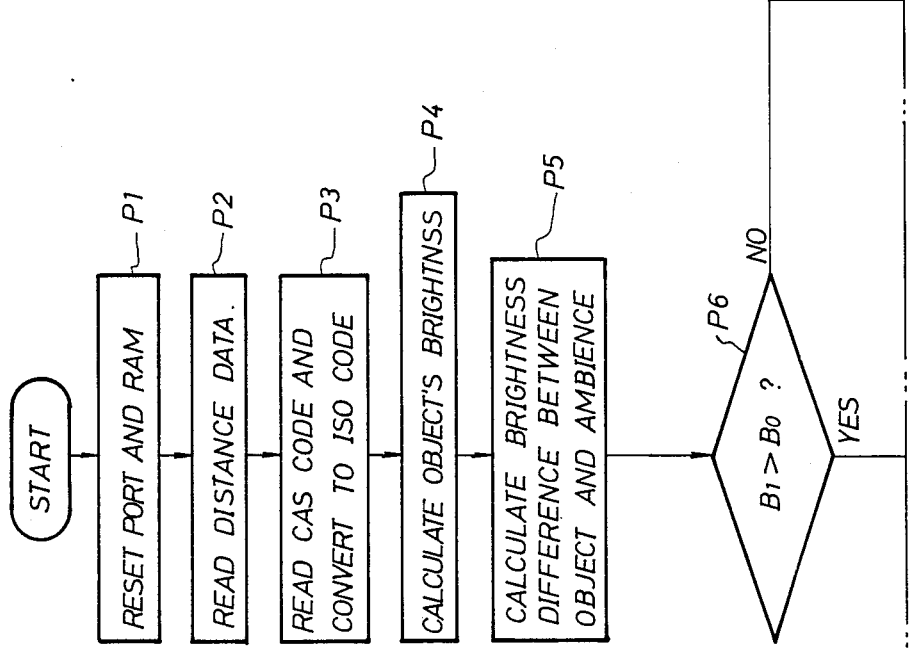
Figure 3:
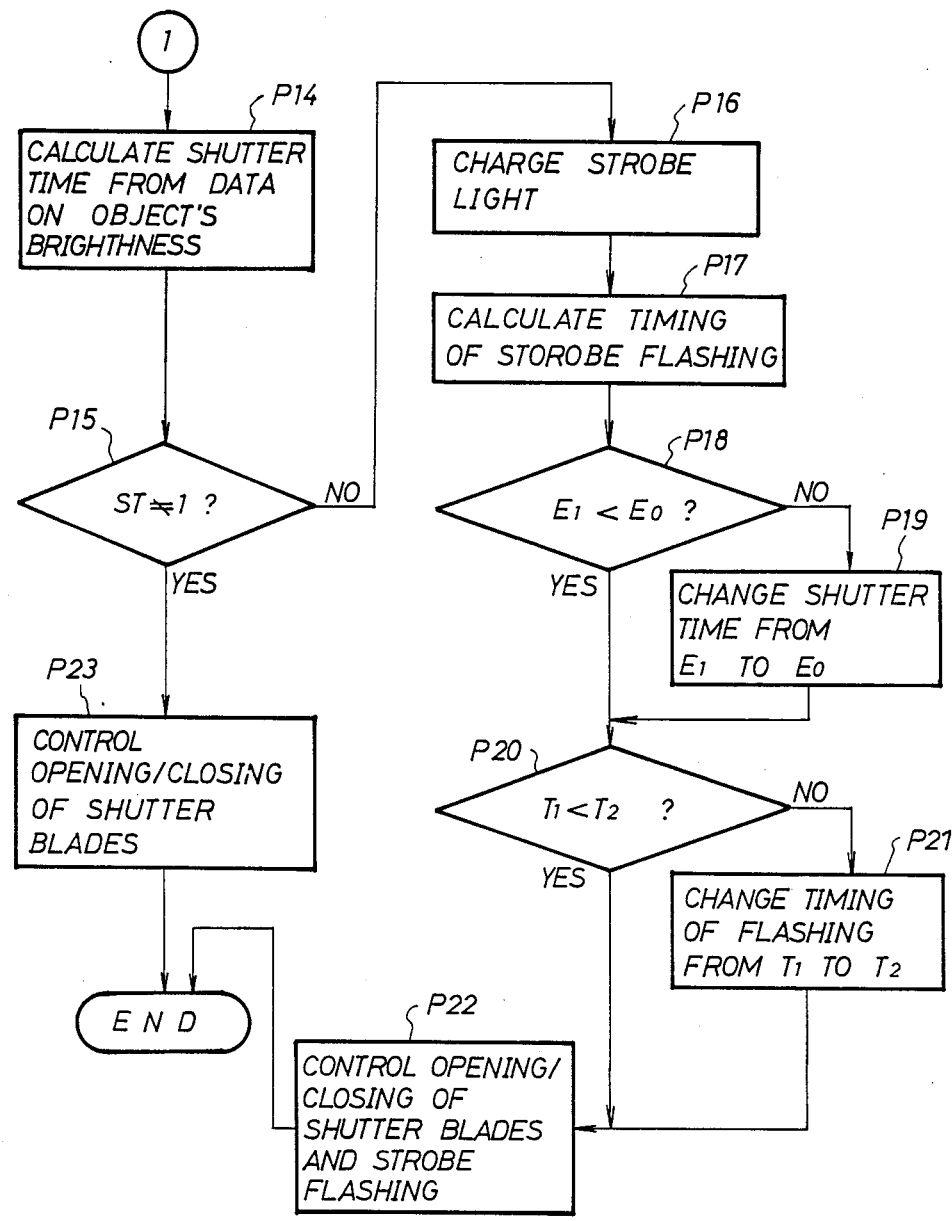

The operation of the camera having such a constitution will now be described with reference to the flowchart of FIGS. 3(a) and (b).

First, a port of the exposure control device 2 and RAM are reset (step P1). Data indicative of the distance L1 between the camera and the object is delivered to the control device 2 (step P2). Data on the film sensitivity is delivered from the CAS code detection unit 6 to the control device 2 where the CAS code is converted to ISO sensitivity data (step P3). The brightness B1 of the main object is calculated on the basis of the data from the photometric unit 1 (step P4). The difference B1−B2 between the brightness B1 of the main object and is ambient brightness B2 is calculated on the basis of data from the photometric unit 1 (step P5). The brightness B1 of the main object is compared with a certain brightness below which a blurred photograph may be produced (hereinafter referred to as a limit brightness B0) corresponding to the ISO sensitivity (step P6). If the brightness B1 of the object is lower than the limit brightness B0, the content of a memory ST are set to "1" (step P7). It is determined whether the main object is in the normal light or in the backlight on the basis of the brightness difference B1—B2 obtained at the step P5 (step P8). If it is determined that the object is in the normal light, the flow of the operation proceeds to step P14 of FIG. 3(b). If it is determined that the object is in the backlight, the distance L1 between the camera and the object obtained at the step 2 is compared and with a certain distance L0 within which the strobe flashing is effectively used (step P9). If L1 is smaller than L0, the content of the memory ST are set to "1" (step P10) and the flow proceeds to step P14 of FIG. 3(b). Otherwise, backlight compensation is performed, and data on the brightness of the object is changed from B1 to B1' (step P11). When the backlight compensation is performed, the shutter time, namely, exposure time, is increased, accordingly. The brightness data B1' is then compared with the limit brightness B0 (step P12). If B1' is greater than B0, the process proceeds to the step P14 of FIG. 3(b). If B1' is smaller than B0, the data on the brightness of the object is changed to the limit brightness data B0 (step P13) and then the flow proceeds to the step P14. The shutter time, namely, exposure time E1, is calculated in accordance with the data on the brightness of the object (step P14). Then, the content of the memory ST is checked (step P15). If the content of the memory ST is not "1", the flow proceeds to step P23 where the opening and closing of the shutter blades are controlled. If the content of the memory ST is "1", the strobe capacitor is charged (step P16). The timing of strobe flash T1 is calculated on the basis of the distance from the camera to the object (step 17). The shutter time E1 calculated at step P14 is compared with a limit shutter time E0 which is predetermined as maximum value in use of the strobe light (step P18). If the shutter time E1 is shorter than the limit shutter time E0, the flow proceeds to step P20. Otherwise, the shutter time is changed from E1 to E0 (step P19) and then the flow proceeds to step P20. The timing T2 at which the shutter blades are started to close corresponding to the shutter time is compared with the timing T1 of the strobe flashing (step P20). If T1<T2, the flows proceeds to step P22. Otherwise, the timing of the strobe flashing is changed from T1 to T2 (step P21) and then the flow proceeds to step P22. Finally, the opening and closing of the shutter blades and strobe flashing are controlled (step P22).

Figure 4A:
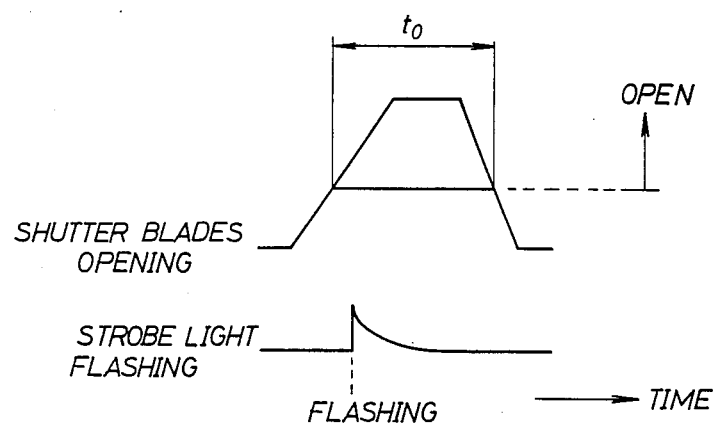
FIGS. 4(a) and (b) illustrate the relationship between the timing of the shutter opening and closing and the timing of strobe flashing.

FIGS. 4(a) and (b) show the relationship in timings between the shutter opening/closing and strobe flashing. As shown in FIG. 4(a), the opening interval of the shutter is limited to a time to so that no blurred photograph could be taken. The strobe light is triggered so as to flash a predetermined time after the shutter starts to open on the basis of the result of the calculation of the timing of the strobe flashing at the control device 2.

Figure 4B:
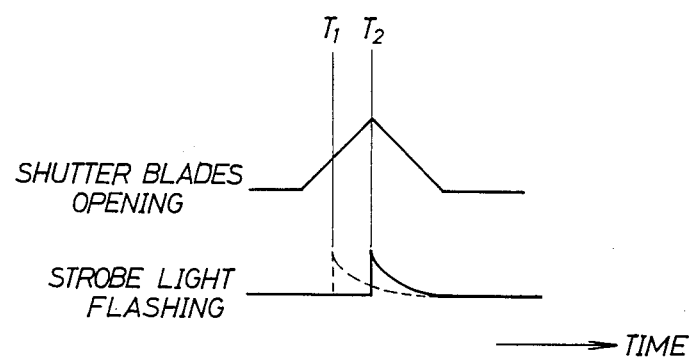

FIG. 4(b) shows the timing in case of the so-called daylight synchronism. If the timing T2 corresponding to the shutter time at which the shutter is to start to close is earlier than the timing T1 calculated on the basis of the distance between the camera and the object at which the strobe light is to flash, the strobe light will flash at the timing T2 whereas if the timing T1 of the strobe flashing is earlier, the strobe light will flash at the timing T1.

When the object is remote from the camera, the shutter time is lengthened without flashing the strobe light, but is prevented from exceeding the time T0.

The camera having the exposure control device according to the invention flashes the strobe light when the object in the backlight is within the range where the flashing is effective, while the object in the backlight is outside the range, the backlight compensation is performed by lengthening the shutter time within the limits of the predetermined time so that no blurred photograph could be taken. With the camera having the exposure control device according to the invention, it is always possible to take a clear picture in the backlight condition irrespective of the distance from the camera to the object.

Although the present invention has been described and shown with reference to a preferred embodiment thereof, it should not be limited to the above embodiment. Various changes and modifications may be made by those skilled in the art without departing from the spirit and scope of the present invention.

What is claimed is:

1. An exposure control device for a camera having a photometric unit for measuring brightness of an object and its ambient brightness individually, a range finding unit for measuring a distance from the device to the object, and a strobe light unit, said device comprising:
   backlight detecting means for detecting whether the object is in a backlight condition or not on the basis of the brightness of the object and its ambient brightness measured by the photometric unit; and
   means for allowing the strobe light to flash in either case the brightness of the object measured by the photometric unit is smaller than a predetermined brightness or the object is detected to be in the backlight condition by the backlight detecting means, if the distance from the device to the object measured by the range finding unit is smaller than a predetermined distance, and for lengthening an exposure time without allowing the strobe light to flash within the limits of a predetermined time in case the object is detected to be in the backlight condition by the backlight detecting means, if the distance from the device to the object measured by the range finding unit is larger than the predetermined distance.

2. A device according to claim 1, wherein said predetermined brightness and said predetermined distance are stored in a memory.

3. A device according to claim 1, wherein the backlight detecting means is adapted to detect that the object is in the backlight condition if the difference between the brightness of the object and its ambient brightness is larger than a predetermined value.

4. A device according to claim 3, wherein said predetermined value is stored in a memory.

5. A device according to claim 1, wherein the means for allowing the strobe light to flash is adapted to lengthen the exposure time in accordance with a film sensitivity.

* * * * *